Figure 1:
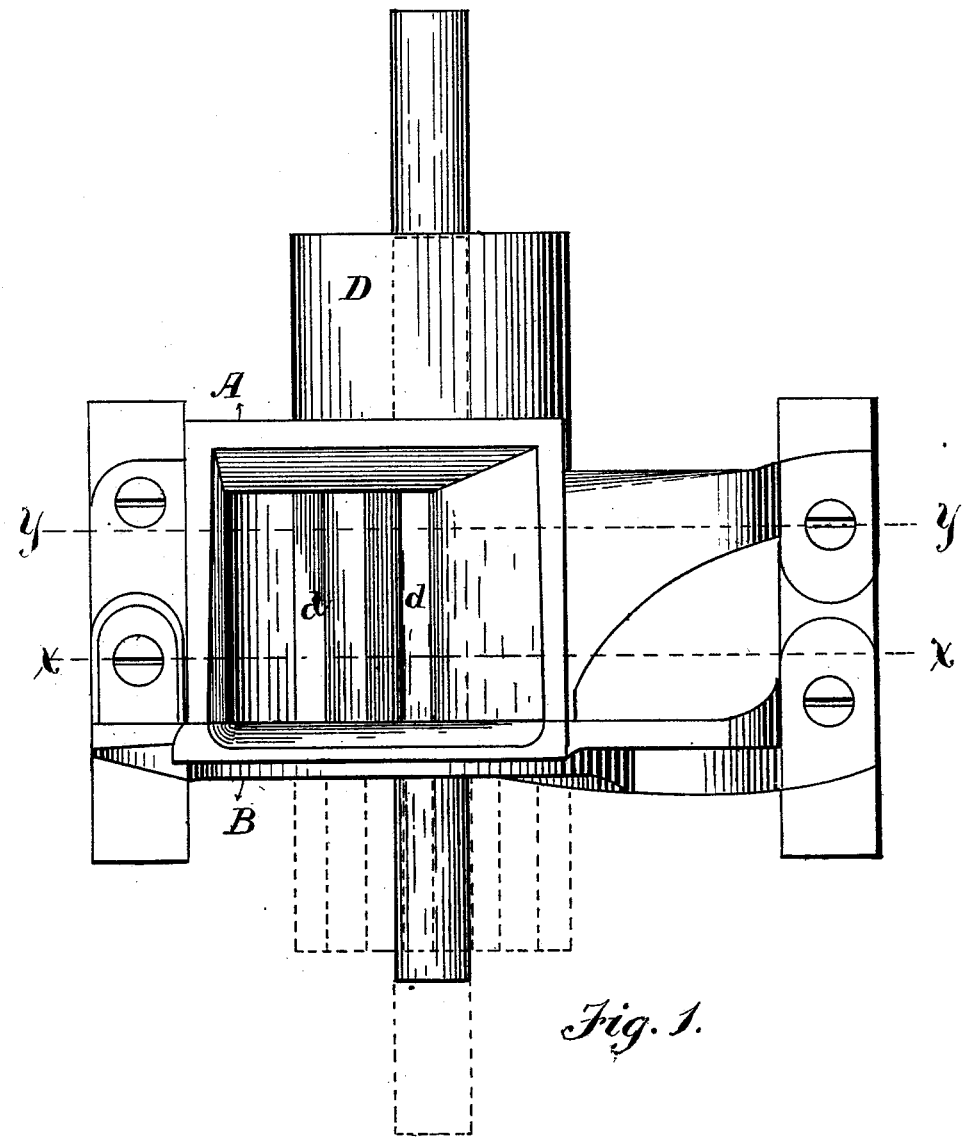

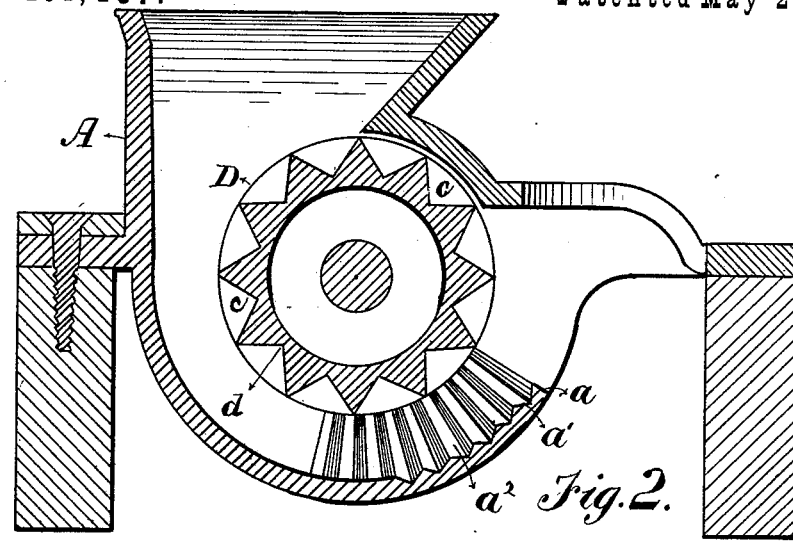
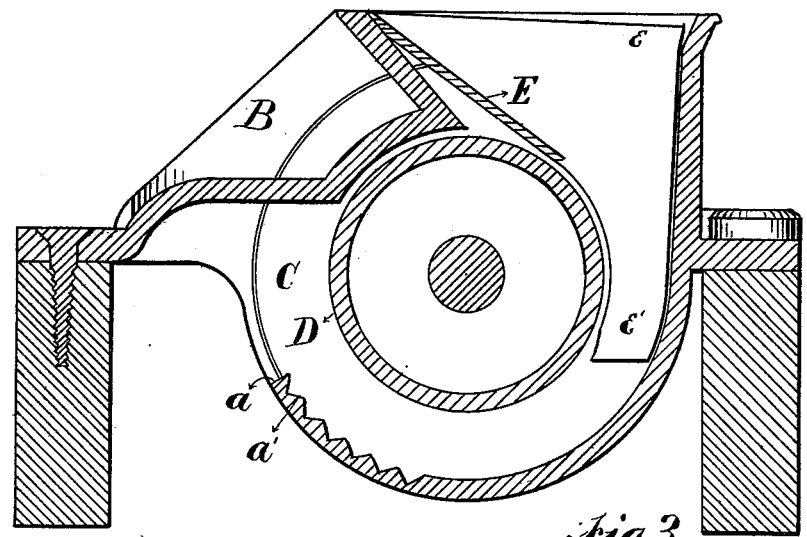
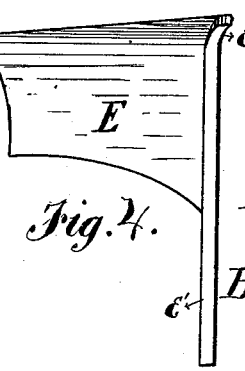

UNITED STATES PATENT OFFICE.

DANIEL STRUNK, OF JANESVILLE, WISCONSIN, ASSIGNOR TO HARRIS MANUFACTURING COMPANY, OF SAME PLACE.

IMPROVEMENT IN SEEDING-MACHINES.

Specification forming part of Letters Patent No. 191,487, dated May 29, 1877; application filed March 12, 1877.

*To all whom it may concern:*

Be it known that I, DANIEL STRUNK, of Janesville, in the county of Rock and State of Wisconsin, have invented a new and useful Improvement in Seeding-Machines, which is fully set forth in the following specification, reference being had to the accompanying drawings, in which—

Figure 1 represents a plan view of a feed-cup containing my improvement; Fig. 2, a vertical section of the same, taken on the line $x\ x$, Fig. 1; Fig. 3, a sectional view taken on the line $y\ y$, Fig. 1, and with the cup turned the other side about; and Fig. 4, a detached view of a shield or cover to be placed over a portion of the feed-wheel when used for sowing small seeds.

My invention relates to that class of seeding-machines in which the grain is distributed by a wheel or cylinder revolving in a cup or case, provided with an opening at any suitable point for the discharge of the seed, and also provided with means for regulating the quantity of seed discharged by the cylinder by the movement of one of the parts relatively to the other.

The object of my invention is to dispense with the cut-off generally used with seeding devices of this kind, which varies the size of the opening in the cup, as the parts are adjusted to sow different quantities. In using a cut-off of this description, whenever the distributing devices are adjusted for sowing small quantities, there is great danger of clogging by the entrance into the cup of coarse matter, like straws or bits of wood, which are much longer than the seeds, and will choke the narrow passage made in the cup by the adjustment of the cut-off.

I effect the regulation of the distribution of the seed by a construction of the cup which permits the passage therein to remain the same size at all times, so that all coarse matter can pass through without choking the flow of the seed, while, at the same time, the distribution may be regulated to sow grains or seeds in the smallest quantities.

The invention consists in roughening a portion of the interior surface of the cup near the discharging-aperture, whereby the flow of seed is retarded, and, in fact, entirely stopped underneath that portion of the distributing-cylinder which is smooth.

It also consists in a device for covering a part of the smooth surface of the distributing-cylinder in the upper part of the cup, to reduce the frictional contact of the cylinder with the seed when adjusted for fine seeds.

In the drawings, the seed cup or case is represented as composed of two parts. The main portion, A, is entirely open at one side, and on the other side is provided with a circular opening of suitable size to receive the feed-cylinder. The other portion, B, of the cup is in the form of a plate, closing up the open side of the main portion A, and is provided with a large circular opening to receive a revolving disk, C.

In the rear side of the cup a discharge-opening, $a$, is provided, and the lower portion or bottom of the casing is extended upon this side of the cup considerably above the level of the bottom, as shown in Figs. 1 and 2 of the drawings, so that the lower edge of the discharge-opening is somewhat higher than usual. This portion of the casing is constructed with serrations $a^1$ upon its inner surface, commencing at the edge of the discharge-opening, and extending back into the bottom of the cup; and, if desired, similar serrations $a^2$ may be made upon the side of the casing opposite to the disk C, as shown in Fig. 2 of the drawings. This latter construction is not absolutely necessary, however, and the cup may be made with or without these side grooves, as desired.

The interior surface of the case, which is grooved, as described above, may be corrugated or roughened in any other suitable manner, it being necessary only that this surface shall be sufficiently rough to prevent the seeds immediately in contact therewith from being easily moved.

The disk C is provided with a central opening, the surrounding edge of which is cut with recesses or notches $c$. The distributing-cylinder D is of ordinary construction; its surface is smooth at one end, while the other is provided with recesses or grooves $d$. The grooved or notched end of the cylinder is made to fit the notched opening in the disk C, through which it is inserted, while the smooth portion finds a bearing in the circular opening in the opposite side of the cup. The cylinder is free to slide back and forth in the cup, and is made of the same diameter throughout its length, though, if desired, the smooth and grooved portions may be of different diameters. It is revolved by any suitable mechanism, and carries the disk C around with it. The corrugated portion of the cylinder should be of sufficient length to extend entirely across the cup, so that full feed may be obtained by proper adjustment whenever desired. When, however, the cylinder is adjusted so that the grooves extend only part way across the cup, and the remaining portion of the cylinder within the cup is smooth, the flow of seed will be retarded to such an extent by the roughened interior surface of the case heretofore described that the smooth portion of the cylinder will slip over or past the seed without driving it out of the discharge in the usual way.

I have found that this method of regulating the feed is practical, even to the successful distribution of exceedingly small seeds, the cylinder being adjusted so that but a very small portion of the grooved surface extends within the cup to throw out the seed, while the smooth surface passes round and round over the seed lying upon the corrugated portion of the cup without discharging any of it, or at least so little as to be of no practical importance. The corrugations in the cup also act to make the discharge regular; for, as the stream of seed is retarded, it will be forced out by the grooves in the cylinder successively, each one being filled and no more, so that the measurement of the seed, as it is distributed, is effected with great precision.

The elevation of the point of discharge from the case assists somewhat this operation, as the seeds in the retarded portion of this stream will not be so easily moved on or over each other to reach the discharge-opening, on account of the rise which they must make.

It will be seen from the above description that the throat of the cup and the entire passage through it is not changed by the adjustment of the cylinder to regulate the feed. There is, therefore, no danger of choking by straws or other coarse material, which will work its way through the passage in the cup without stopping the regular feed.

In sowing very small seeds it is desirable to cover a part of the upper surface of the feed-cylinder, so as to reduce its frictional contact with the seed. For this purpose I provide a small curved plate, E, which is made to fit the throat of the cup and extend down part way over the cylinder, as shown in Fig. 3 of the drawings.

On the side next to the revolving disk this plate is also provided with a vertical flange, $e$, which entirely fills the space on that side of the cup, and is provided with an extension, $e'$, fitting down into the passage, as shown in Fig. 3 of the drawings.

This flange is intended to be fitted to the cup nicely, so as to prevent the passage of any small seeds into the point between the revolving disk and casing, which would choke the revolution of the cylinder, and also to cover a portion of the disk, for the purpose of reducing the frictional contact of the seed therewith.

The particular construction of the parts as shown and described is not necessary to my invention, for it is evident that the devices may be changed in many ways without departing from the principle of operation herein set forth.

In a full-sized machine the feed wheels or cylinders may be arranged to move, while the cups are stationary; or the cups may be secured to a movable frame, and the feed-wheels remain stationary, except in their rotary movement, for the purpose of effecting the necessary adjustments to regulate the feed.

Having thus described my invention, what I claim as new, and desire to secure by Letters Patent, is—

1. A seed case or cup adapted to receive a revolving feed wheel or cylinder, and constructed with a portion of its interior surface corrugated or roughened near the discharge-opening, substantially as and for the purpose set forth.

2. A revolving feed wheel or cylinder, adjustable laterally to vary the quantity of seed discharged, in combination with a seed case or cup having a section of its interior surface corrugated or roughened, substantially as and for the purpose set forth.

3. A revolving feed wheel or cylinder, provided with means for varying the capacity of its seed-discharging receptacles, in combination with a seed case or cup having its discharge-opening elevated somewhat above the lowest point of its interior vertical diameter, and constructed with a portion of its internal surface corrugated or roughened, substantially as and for the purpose set forth.

4. The seed case or cup, in combination with a plate or cover, E, adapted to be fitted in the throat of the cup, and extend over a part of the smooth portion of the feed-wheel, to reduce friction whenever desired, substantially as and for the purpose set forth.

5. The plate or cover E, constructed with a vertical flange, $e$, at one side, having a curved extension, $e'$, fitting down around the cylinder, and covering the points at the side of the cup, substantially as and for the purpose set forth.

DANIEL STRUNK.

Witnesses:
J. M. THACHER,
M. M. DILLON.